United States Patent
Tom et al.

[11] Patent Number: 5,985,008
[45] Date of Patent: Nov. 16, 1999

[54] SORBENT-BASED FLUID STORAGE AND DISPENSING SYSTEM WITH HIGH EFFICIENCY SORBENT MEDIUM

[75] Inventors: Glenn M. Tom, New Milford; James V. McManus, Danbury, both of Conn.

[73] Assignee: Advanced Technology Materials, Inc., Danbury, Conn.

[21] Appl. No.: 09/082,373

[22] Filed: May 20, 1998

Related U.S. Application Data

[62] Continuation-in-part of application No. 08/809,019, Mar. 27, 1998, and application No. 08/322,224, filed as application No. PCT/US95/13040, Oct. 13, 1995, Pat. No. 5,518,528

[60] Provisional application No. 60/047,154, May 20, 1997.

[51] Int. Cl.⁶ .................................................. B01D 53/04
[52] U.S. Cl. .............................. 96/143; 96/108; 96/147
[58] Field of Search ............................. 95/133, 901, 903; 96/108, 121, 122, 126–128, 130–132, 143, 146, 147

[56] References Cited

U.S. PATENT DOCUMENTS

| | | | |
|---|---|---|---|
| 240,423 | 4/1881 | James | 206/0.7 |
| 1,608,155 | 11/1926 | Barnebey | 206/0.7 |
| 1,714,245 | 5/1929 | Schaefer | 96/146 |
| 2,356,334 | 8/1944 | Maude et al. | 206/0.7 |
| 2,450,289 | 9/1948 | Marek | 96/146 |
| 2,663,626 | 12/1953 | Spangler | 206/0.7 |
| 2,987,139 | 6/1961 | Bush | 95/133 |
| 2,997,371 | 8/1961 | Wadsworth et al. | 95/131 |
| 3,006,153 | 10/1961 | Cook | 206/0.7 |
| 3,080,307 | 3/1963 | Rinald | 96/127 |
| 3,093,564 | 6/1963 | Weisman et al. | 96/127 |
| 3,116,132 | 12/1963 | Haller et al. | 95/132 |
| 3,144,200 | 8/1964 | Taylor et al. | 96/108 |
| 3,264,803 | 8/1966 | Read | 96/146 |
| 3,287,432 | 11/1966 | Sensel | 95/95 |
| 3,415,069 | 12/1968 | Hauser | 96/126 |
| 3,469,375 | 9/1969 | Barrington et al. | 96/146 |
| 3,675,392 | 7/1972 | Reighter | 95/96 |
| 3,713,273 | 1/1973 | Coffee | 96/128 |
| 3,719,026 | 3/1973 | Sand | 95/106 |
| 3,788,036 | 1/1974 | Lee et al. | 96/130 |
| 4,023,701 | 5/1977 | Dockery | 206/0.7 |
| 4,263,018 | 4/1981 | McCombs et al. | 96/130 |
| 4,343,770 | 8/1982 | Simons | 206/0.7 |
| 4,414,005 | 11/1983 | DeBiévre et al. | 95/127 |
| 4,578,256 | 3/1986 | Nishino et al. | 95/133 |
| 4,723,967 | 2/1988 | Tom | 96/108 X |
| 4,738,693 | 4/1988 | Tom | 96/108 X |
| 4,738,694 | 4/1988 | Godino et al. | 96/126 |
| 4,744,221 | 5/1988 | Knollmueller | 62/48 |
| 4,749,384 | 6/1988 | Nowobilski et al. | 96/108 |
| 4,761,395 | 8/1988 | Tom et al. | 502/401 |

(List continued on next page.)

FOREIGN PATENT DOCUMENTS

| | | | |
|---|---|---|---|
| 1095796 | 12/1960 | Germany | 95/133 |
| 2264512 | 1/1974 | Germany | 95/133 |
| 3139-781 | 4/1983 | Germany | 96/122 |
| 61-133116 | 6/1986 | Japan | 96/126 |
| 63-88017 | 4/1988 | Japan | 96/121 |
| 3-127606 | 5/1991 | Japan | 96/108 |
| 52-72373 | 6/1997 | Japan | 96/130 |
| 1181692 | 9/1985 | U.S.S.R. | 95/133 |
| 1544475A1 | 2/1990 | U.S.S.R. | 95/131 |
| 1583151A1 | 8/1990 | U.S.S.R. | 95/133 |

OTHER PUBLICATIONS

"Beaded carbon ups solvent recovery", *Chemical Engineering*, vol 84, No. 18, pp. 39–40, Aug. 29, 1977.

*Primary Examiner*—Robert Spitzer
*Attorney, Agent, or Firm*—Steven J. Hultquist; Oliver A.M. Zitzmann

[57] ABSTRACT

A solid-phase physical sorbent-based fluid storage and dispensing system, in which the sorbent is a particulate activated carbon of specific pore character. The sorbent may be washed, e.g., with hydrofluoric acid, to remove adverse trace metals and oxidic transition metal species therefrom.

13 Claims, 9 Drawing Sheets

U.S. PATENT DOCUMENTS

| | | | |
|---|---|---|---|
| 4,881,958 | 11/1989 | Eckardt et al. | 96/127 |
| 5,051,117 | 9/1991 | Prigge et al. | 95/95 |
| 5,089,244 | 2/1992 | Parent et al. | 95/133 |
| 5,133,787 | 7/1992 | Diot et al. | 96/121 |
| 5,151,395 | 9/1992 | Tom | 502/67 |
| 5,202,096 | 4/1993 | Jain | 96/126 |
| 5,238,469 | 8/1993 | Briesacher et al. | 96/126 |
| 5,385,689 | 1/1995 | Tom et al. | 252/194 |
| 5,409,526 | 4/1995 | Zheng et al. | 96/132 |
| 5,417,742 | 5/1995 | Tamhankar et al. | 95/96 |
| 5,518,528 | 5/1996 | Tom et al. | 95/103 |
| 5,704,965 | 1/1998 | Tom et al. | 95/95 |
| 5,704,967 | 1/1998 | Tom et al. | 96/143 |
| 5,707,424 | 1/1998 | Tom et al. | 95/95 |
| 5,710,092 | 1/1998 | Baker | 95/901 X |
| 5,761,910 | 6/1998 | Tom | 96/108 X |
| 5,800,596 | 9/1998 | Collin et al. | 96/108 X |
| 5,882,384 | 3/1999 | Tom et al. | 96/147 X |

FIG.9 ns that the use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

SORBENT-BASED FLUID STORAGE AND DISPENSING SYSTEM WITH HIGH EFFICIENCY SORBENT MEDIUM

CROSS-REFERENCE TO RELATED APPLICATIONS

This application is based on and claims priority of U.S. Provisional Patent Application No. 60/047,154 filed May 20, 1997 in the names of Glenn M. Tom and James V. McManus for "Sorbent-Based Fluid Storage and Dispensing System with High Efficiency Sorbent Medium." This application also is a continuation-in-part and claims priority of U.S. patent application No. 08/809,019 filed Mar. 27, 1998 in the names of Glenn M. Tom and James V. McManus for "Storage and Delivery System for Gaseous Compounds," which is a §371 application based on International Application No. PCT/US95/13040 filed Oct. 13, 1995 and claiming the priority of U.S. patent application No. 08/322,224 filed Oct. 13, 1994, now U.S. Pat. No. 5,518,528.

BACKGROUND OF THE INVENTION

1. Field of the Invention

This invention relates generally to storage and dispensing systems for the selective dispensing of fluids from a vessel in which the fluid component(s) are sorptively retained by a solid sorbent medium, and are desorptively released from the sorbent medium in the dispensing operation. More particularly, the present invention relates to system of such type in which the sorbent medium is of a highly efficient character.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

Sorbent media vary widely in a number of critical characteristics, including pore size, pore size distribution, cumulative pore volume, tortuosity characteristics of pores, which are inevitably non-linear in character, etc.

The variation of such sorbent parameters can effect wide differences in the performance behavior of the sorbent-based fluid storage and dispensing vessel of the general type disclosed in the Tom et al. patent.

Accordingly, it is an object of the present invention to provide a sorbent-based fluid storage and dispensing system of such type, having very highly effective sorbent characteristics.

Other objects and advantages of the invention will be more fully apparent from the ensuing disclosure.

SUMMARY OF THE INVENTION

The present invention relates to a system for storage and dispensing of a sorbable fluid, comprising a storage and dispensing vessel constructed and arranged to hold a solid-phase physical sorbent medium having a sorptive affinity for the sorbable fluid, and for selectively flowing sorbable fluid into and out of such vessel.

A solid-phase physical sorbent medium having a sorptive affinity for the fluid is disposed in the storage and dispensing vessel at an interior gas pressure. The sorbable fluid is physically adsorbed on the sorbent medium.

Means are provided for discharging desorbed fluid from the storage and dispensing vessel. Such means may comprise a dispensing assembly coupled in gas flow communication with the storage and dispensing vessel, and constructed and arranged for selective on-demand dispensing of desorbed fluid, after thermal, concentration differential- and/or pressure differential-mediated desorption of the fluid from the sorbent material. The dispensing assembly may be constructed and arranged:

(I) to provide, exteriorly of said storage and dispensing vessel, a pressure below said interior pressure, to effect desorption of fluid from the sorbent material, and flow of desorbed fluid from the vessel through the dispensing assembly; and/or (II) to flow thermally desorbed fluid therethrough, and comprising means for heating the sorbent material to effect desorption of the fluid therefrom, so that the desorbed fluid flows from the vessel into the dispensing assembly.

The high efficiency sorbent medium of the present invention as employed in the storage and dispensing system described hereinabove comprises an activated carbon sorbent having substantially all of its pores in the pore diameter range of from 5 Å to 40 Å (at least 95% of the porosity being in such range), with at least 75% of the pores being in a range of from 4 Å to 25 Å, with a maximum pore volume measured by differential pore volume plot (e.g., Horvath-Kawazoe Differential Pore Volume Plot) having a maximum between 5 Å and 10 Å pore diameter, and with the sorbent having a cumulative pore volume between 0.35 and 0.6.

Useful material of such type includes so-called bead activated carbon sorbent having a highly uniform spherical particle shape. Bead activated carbon materials of such type, having low ash content, are commercially available from Kureha Corporation of America, New York, N.Y. , and are available in grades BAC-MP, BAC-LP, and BAC-G-70R.

Comparative evaluation of a number of sorbent materials demonstrate the storage and dispensing system of the invention utilizing high efficiency carbon sorbent of the foregoing characteristics to evidence a very high efficiency in terms of working capacity. Working capacity is defined as the weight of sorbent originally loaded on the sorbent material which is removable from the sorbent medium in the fluid dispensing operation, at given pressure and temperature conditions, per unit volume of the sorbent material (in bed form, including interstitial void volume of the bed). Such sorbent working capacity for arsine as a working fluid, measured at 5 torr and 650 torr, yields a sorbent working capacity of on the order of 250 to 275 grams arsine per liter of sorbent material, at 25 ° C. Such working capacity is surprisingly and unexpectedly superior to zeolite materials, and enables a high efficiency fluid storage and dispensing system to be constructed.

Further, the high efficiency sorbent medium of the invention is characterized by a high percent desorbable sorbate which is in the range of 60–90%, again far exceeding the percent desorbable sorbate for a corresponding zeolite material, e.g. 20–65% for binderless zeolite.

The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species.

Other aspects and features of the invention will be more fully apparent from the ensuing disclosure.

DETAILED DESCRIPTION OF THE INVENTION, AND PREFERRED EMBODIMENTS THEREOF

The disclosures of the following U.S. patents and U.S. patent applications are hereby incorporated herein by reference in their entirety:

U.S. patent application No. 08/809,019 filed Mar.27, 1998;

U.S. Pat. 5,518,528 issued May 21, 1996;

U.S. Pat. 5,704,965 issued Jan. 6, 1998;

U.S. Pat. 5,704,967 issued Jan. 6, 1998;

U.S. Pat. 5,707,424 issued Jan. 13, 1998;

U.S. patent application No.08/859,172 filed May 20, 1997; and

U.S. patent application No. 09/002,278 filed Dec. 31, 1997.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Figure 1:
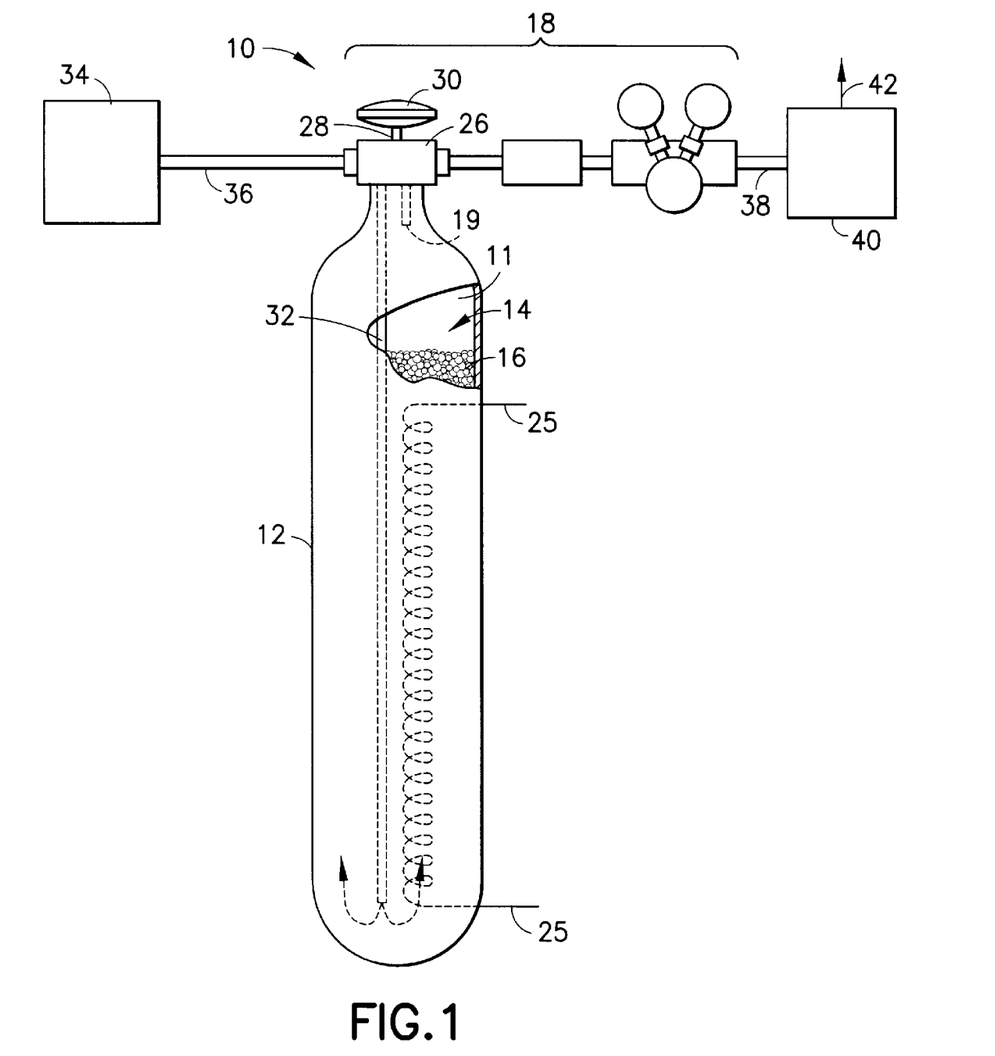
FIG. 1 is a schematic perspective representation of a storage and dispensing vessel and associated flow circuitry according to one embodiment of the invention, which may be usefully employed for the storage and dispensing of fluid.

Referring now to the drawings, FIG. 1 is a schematic representation of a storage and dispensing system 10 comprising a storage and dispensing vessel 12. The storage and dispensing vessel may for example comprise a conventional gas cylinder container of elongate character. In the interior volume 11 of such vessel is disposed a bed 14 of a suitable solid-phase physical adsorbent medium 16 having sorptive affinity for the gas.

The vessel 12 is provided at its upper end with a conventional cylinder head assembly 18 coupled with the main body of the cylinder 12 at the port 19. Port 19 allows fluid flow from the interior volume 11 of the cylinder into the dispensing assembly 18. To prevent entrainment of particulate solids in the fluid being dispensed from the cylinder, the port 19 may be provided with a frit or other filter means therein. The cylinder head assembly includes a main valve body 26 containing a valve element (not shown) which is mechanically coupled by valve stem 28 with a hand wheel 30. The hand wheel is manually actuatable to open the valve to flow of the gas through port 19.

The main valve body 26 is also optionally connected to a carrier gas feed conduit 36, which is joined in turn to carrier gas source 34. The carrier gas may be an inert gas such as argon, helium, nitrogen or the like, and the carrier gas source 34 may be a cylinder or other source vessel for such gas. The carrier gas may be flowed through the feed conduit 36 to dip tube 32 for egress at the lower end of the dip tube into the interior volume 11 of the vessel 12 .

To control the flow and rate of the carrier gas, the main valve body may be provided with a separate flow control or actuator, and/or a flow control means (a flow control valve, mass flow controller, etc.) may be provided in the feed conduit 36, to yield an appropriate flow of the carrier gas stream through the vessel, for subsequent discharge into the dispensing assembly 18. By such flow of carrier gas through the vessel, a concentration differential is created that mediates the release of the gas from the solid-phase physical support medium in the bed 14.

Alternatively, or additionally, the gas dispensing operation may be carried out with release of the gas from the sorbent particles in the bed 14, by pressure differential-mediated release of the gas. Such pressure differential may be established by flow communication between the storage and dispensing vessel, on the one hand, and the exterior dispensing environment or locus of use, on the other.

For example, the dispensing assembly 18 may be coupled in fluid flow communication with a downstream discharge conduit 38 discharging the gas to a lower pressure end use facility 40, such as an ion implantation operation in a semiconductor manufacturing plant.

In the end use facility, the gas is utilized in a process carried out therein, and a vent or waste gas is produced, which is discharged in the vent conduit 42 from the facility. The end use facility may in the case of semiconductor manufacturing include other gas-consuming operations, such as epitaxial growth, etching, chemical mechanical planarization, cleaning, lithography, etc.

The vessel 12 may be provided with internal heating means schematically represented by heating coil 25 (suitably energized by power supply means, not shown in FIG. 1) which serves to thermally assist disengagement of the fluid from the sorbent.

Preferably, however, the fluid is at least partially, and most preferably fully, dispensed from the storage and dispensing vessel containing the fluid by pressure differential-mediated release and/or concentration differential-mediated release of the fluid from the sorbent.

The solid-phase physical adsorbent medium 16 may comprise a suitable high surface area material having sorptive capacity for the gas, so that the sorbent satisfactorily holds the gas to be stored and subsequently dispensed from the vessel 12. The sorbent may for example comprise a bead activated carbon sorbent of highly uniform spherical particle shape, such as the BAC-MP, BAC-LP, and BAC-G-70R bead carbon materials commercially available from Kureha Corporation of America (New York, N.Y.).

The sorbent may be suitably processed or treated to ensure that it is devoid of trace components which may deleteriously affect the performance of the fluid storage and dispensing system. For example, the solid-phase physical adsorbent medium may be subjected to washing treatment, e.g., with hydrofluoric acid, to render it sufficiently free of trace components such as metals and oxidic transition metal species.

In preferred practice, the solid-phase physical adsorbent medium is a high surface area medium. As used herein, the term high surface area medium means a material having at least 10 square meters of surface area per gram of material, with the surface area being determined by BET surface area determination using liquid nitrogen as the working fluid, a methodology well known to those skilled in the art of determining material surface area characteristics. Preferably, the surface area determined by such BET method is at least 50 square meters per gram, and most preferably the surface area is at least 100 square meters per gram as determined by the BET method.

The system of the invention optionally may be constructed with the sorbent being provided in the storage and dispensing vessel in combination with a chemisorbent material having a sorptive affinity for contaminants, e.g., decomposition products, of the fluid stored therein. Such chemisorbent material may for example comprise a material such as barium metal, protected from contact with the fluid being stored, in a restricted area or compartment of the vessel permeable to the contamination species to be chemisorbed.

Figure 2:
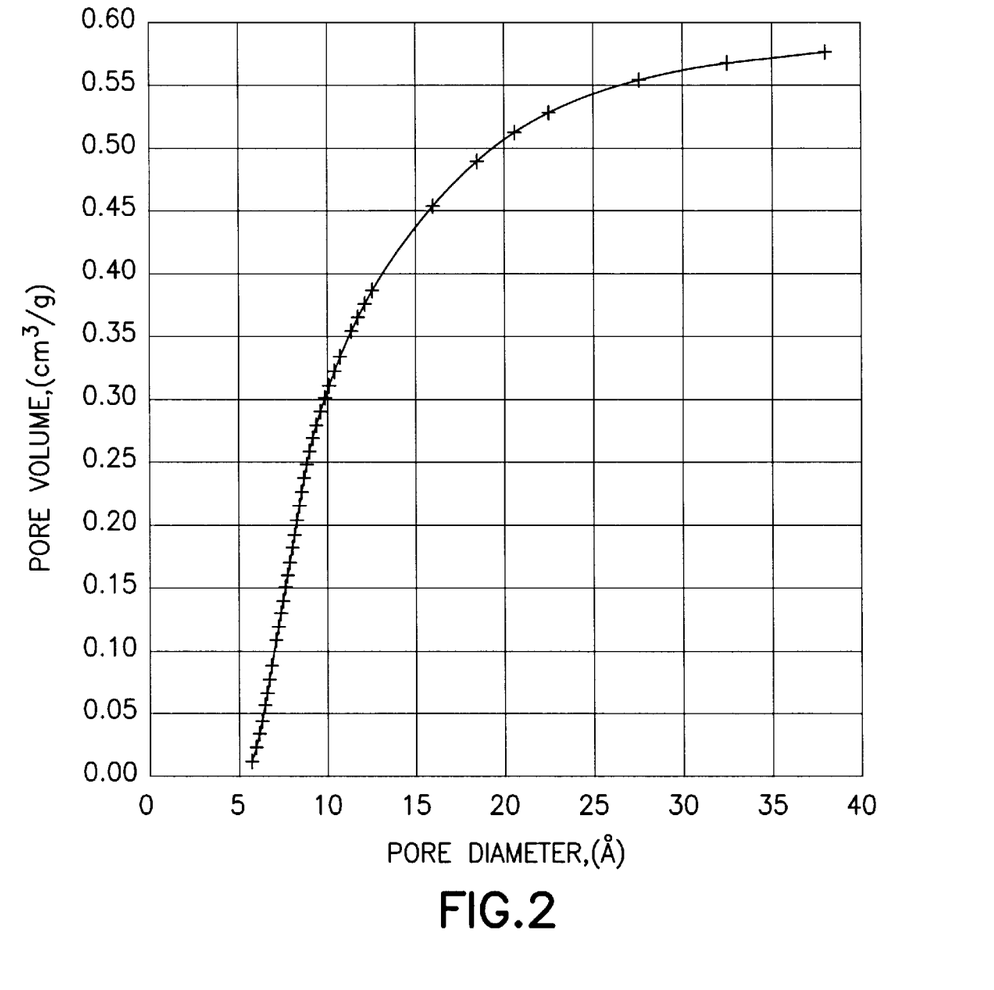
FIG. 2 is a cumulative pore volume plot of pore volume in cubic centimeters per gram, as a function of pore diameter in Angstroms, measured by the Horvath-Kawazoe Cumulative Pore Volume Determination Technique.

FIG. 2 is a Horvath-Kawazoe Cumulative Pore Volume Plot, of pore volume in cubic centimeters per gram as a function of pore diameter. This plot is for an activated carbon material having high efficiency characteristics in the fluid storage and dispensing system of the invention.

This sorbent material, as shown, has pores with a diameter in the range of from 5 to 40 Å , with the cumulative pore volume being approximately 0.57.

Figure 3:
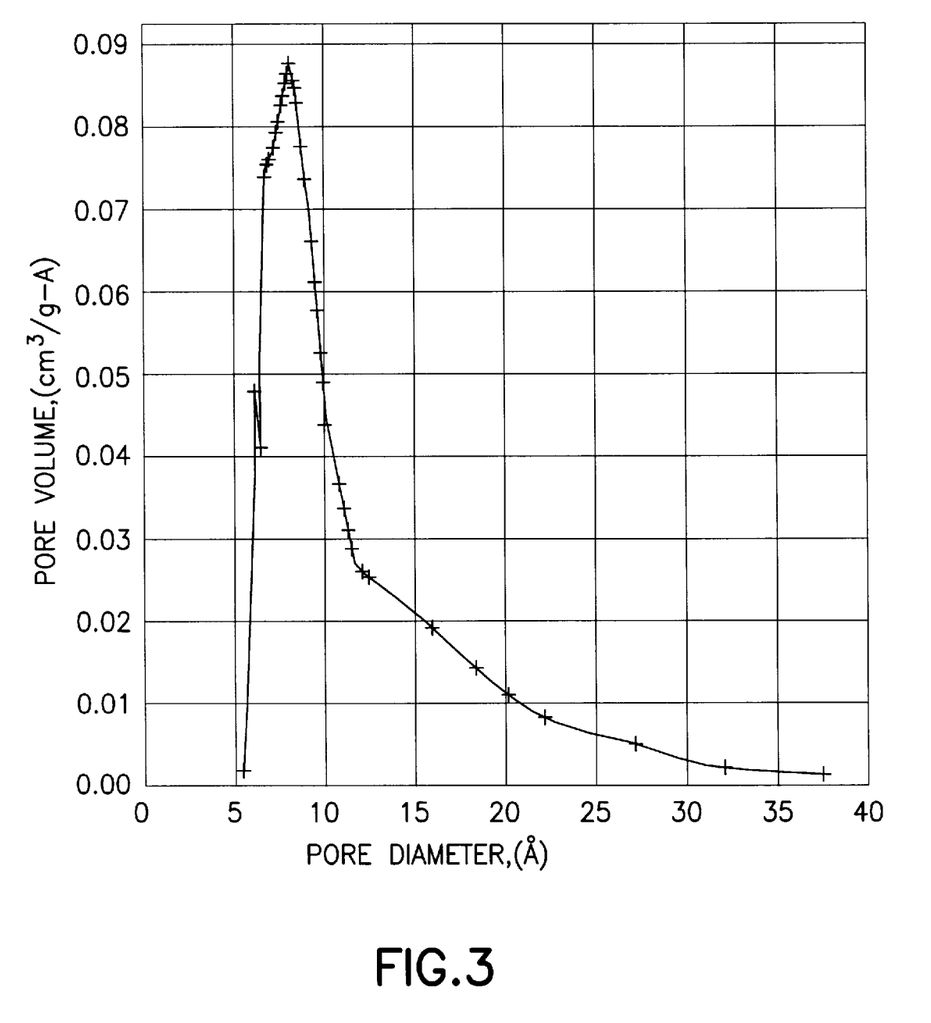
FIG. 3 is a Horvath-Kawazoe Differential Pore Volume Plot showing pore volume in cubic centimeters per gram-angstrom, as a function of pore diameter in Angstroms.

FIG. 3 is a Horvath-Kawazoe Differential Pore Volume Plot of pore volume in cubic centimeters per gram-Angstrom, as function of pore diameter, showing that more than 75% of the pores of the high efficiency activated carbon sorbent have pores between 4 Å and 25 Å , with a maximum pore diameter between 5 Å and 10 Å.

Figure 4:
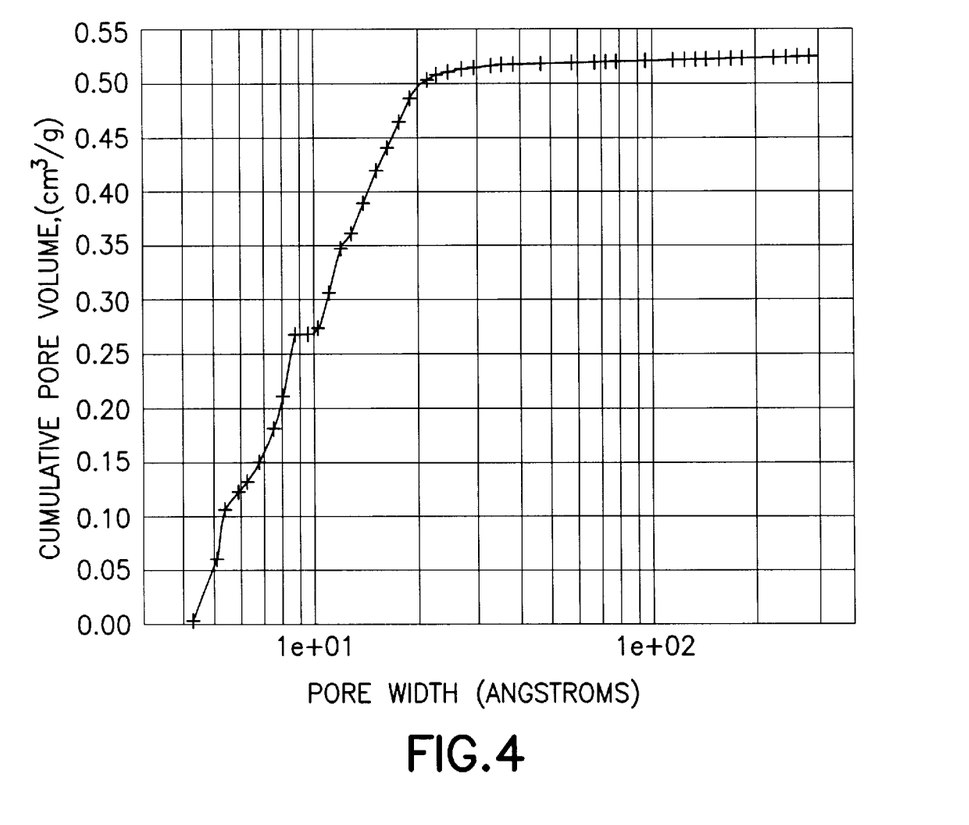
FIG. 4 is cumulative pore volume plot, showing the cumulative pore volume in cubic centimeters in gram, as a function of pore width (diameter), in Angstroms.

FIG. 4 is a Cumulative Pore Volume Plot showing cumulative pore volume in cubic centimeters per gram, as a function of pore width (diameter) in Angstroms for a high performance activated carbon sorbent useful in the practice of the present invention. The plot in FIG. 4 was determined by a non-negative regularization method with no smoothing of the data. This plot shows that the cumulative pore volume is approximately 0.52, in general agreement with the Horvath-Kawazoe Cumulative Pore Volume Plot of FIG. 2.

Figure 5:
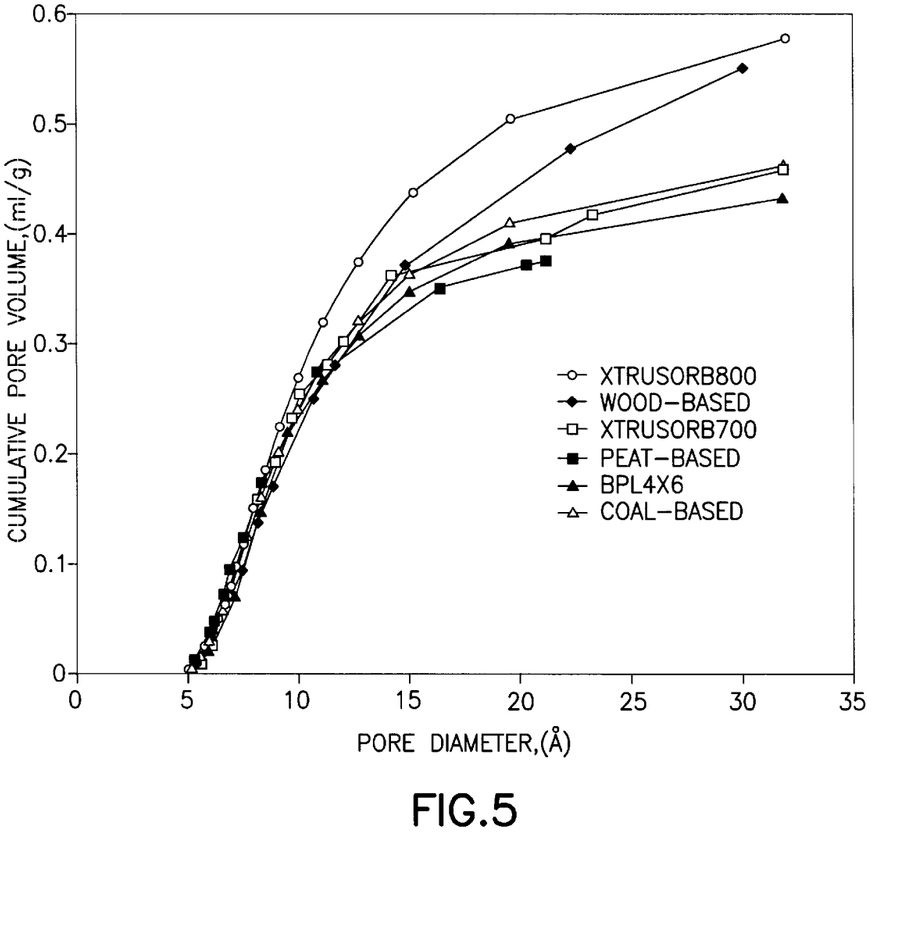
FIG. 5 is a plot of cumulative pore volume in milliliters per gram, as a function of pore diameter, in Angstroms, for various carbon based sorbents having utility in the present invention.

FIG. 5 is a plot of cumulative pore volume, in milliliters per gram, as a function of pore diameter in Angstroms, for various carbon sorbent materials having utility in the broad practice of the invention. The carbon sorbents represented by the various curves in FIG. 5 include wood-based, peat-based and coal-based carbon sorbent media. As shown, the cumulative pore volumes for these high-efficiency materials are in the range of from about 0.35 to about 0.58.

While the plots of FIGS. 2 and 4 are not strictly identically correlative in quantitative terms, the respective graphs nonetheless show closely consistent material characteristics.

The activated carbon sorbent useful in the practice of the present invention, and having performance characteristics represented by the data plots of FIGS. 2–4, preferably has a particle size in the range of from about 0.1 millimeter to 1 centimeter diameter, and more preferably from about 0.25 to about 2 millimeters diameter, however, it will be recognized that the particle size of the sorbent in the practice of the present invention may be widely varied, to achieve a specific packing density of the sorbent in the sorbent bed, to obtain a desired loading of the sorbate fluid on the bed.

The following data serve to illustrate the advantages of the activated carbon sorbent of the present invention vs. zeolite. The experiments measured the amount of arsine stored between about 650 Torr and 5 Torr for the gas storage and dispensing system. Adsorption isotherms were measured at 20° C. using 0.5 gram samples of the adsorbents with a Micromeritics Inc. porosimeter. The isotherm data were scaled to model the delivery characteristics of the gas storage and dispensing system cylinder sizes which are standard in the ion implant industry, the WY (0.41 L), JY (2.25 L), and UY (6.6 L). The scaling technique had previously been validated experimentally.

Pressure vs. Delivery Capacities

| % Remaining | % Used | Pressure (Torr) | cc AsH3/gram Sorbent | grams/ WY | grams/ JY | grams/ UY |
|---|---|---|---|---|---|---|
| ACTIVATED CARBON SORBENT ||||||||
| 100.0 | 0.0 | 6.87 | 149 | 119.1 | 649 | 1983 |
| 96.0 | 4.0 | 589 | 143 | 114.3 | 622 | 1903 |
| 91.3 | 8.7 | 490 | 136 | 108.7 | 592 | 1810 |
| 86.6 | 13.4 | 401 | 129 | 103.1 | 561 | 1717 |
| 79.2 | 20.8 | 302 | 118 | 94.3 | 514 | 1570 |
| 71.8 | 28.2 | 227 | 107 | 85.5 | 466 | 1424 |
| 64.4 | 35.6 | 174 | 96 | 76.8 | 418 | 1278 |
| 56.4 | 43.6 | 126 | 84 | 67.2 | 366 | 1118 |
| 47.7 | 52.3 | 85 | 71 | 56.8 | 309 | 945 |
| 40.3 | 59.7 | 61 | 60 | 48.0 | 261 | 799 |
| 30.9 | 69.1 | 36 | 46 | 36.8 | 200 | 612 |
| 20.1 | 79.9 | 15 | 30 | 24.0 | 131 | 399 |
| 10.7 | 89.3 | 5 | 16 | 12.8 | 70 | 213 |
| BINDERLESS ZEOLITE 5A ||||||||
| 100.0 | 0.0 | 663 | 74.7 | 77.6 | 416 | 1219 |
| 99.3 | 0.7 | 590 | 74.2 | 77.0 | 413 | 1211 |
| 96.1 | 3.9 | 395 | 71.8 | 74.6 | 399 | 1172 |
| 92.1 | 7.9 | 248 | 68.8 | 71.4 | 383 | 1123 |
| 86.7 | 13.3 | 138 | 64.8 | 67.3 | 360 | 1057 |
| 80.5 | 19.5 | 77 | 60.1 | 62.4 | 334 | 981 |
| 69.6 | 30.4 | 35 | 52 | 54.0 | 289 | 849 |
| 54.6 | 45.4 | 15 | 40.8 | 42.4 | 227 | 666 |
| 32.7 | 67.3 | 5 | 24.4 | 25.3 | 136 | 398 |

FIGS. 6–9 illustrate the data given above.

Figure 6:
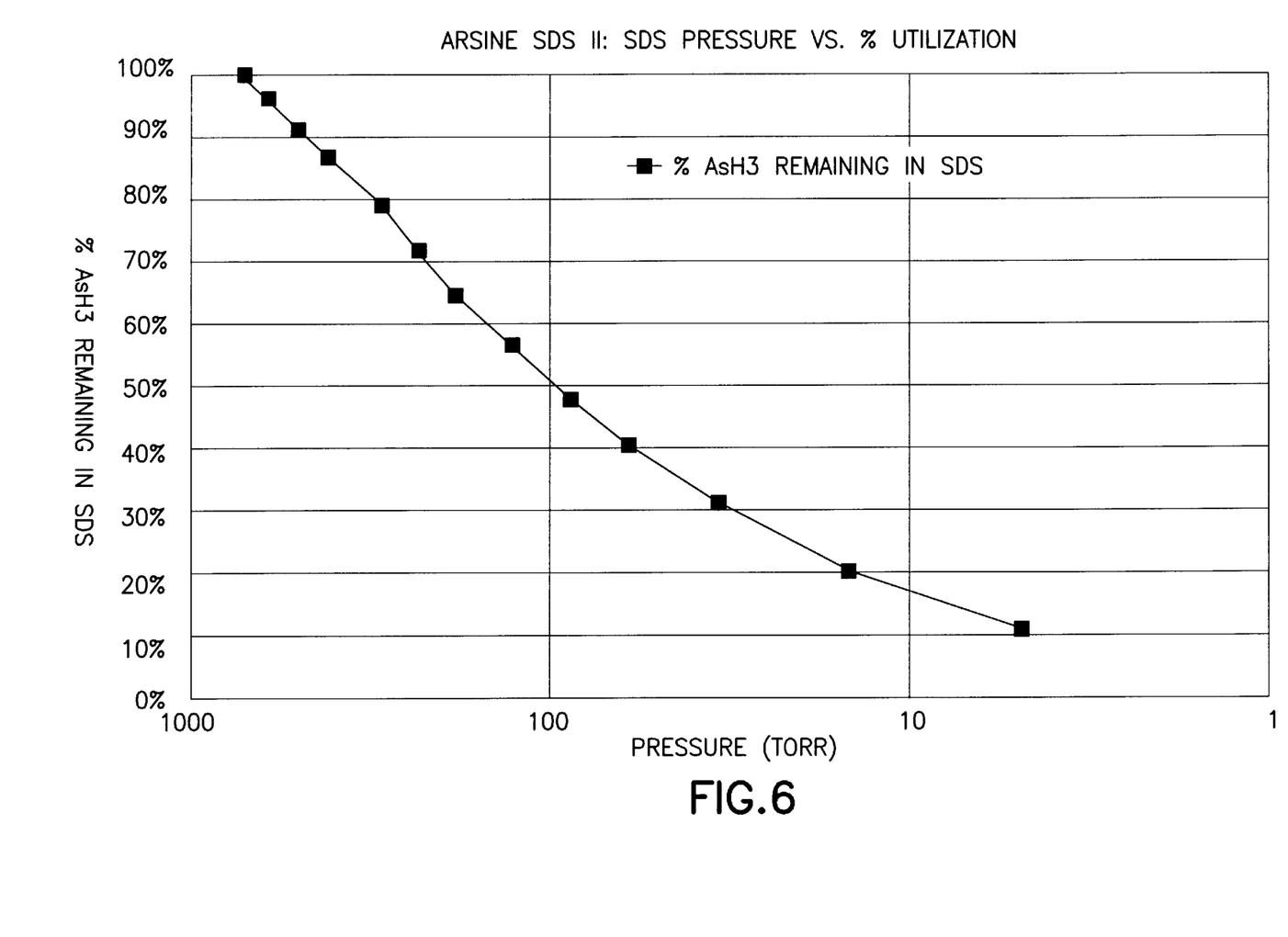
FIG. 6 is a plot of percent $AsH_3$ remaining in the delivery system cylinder vs. cylinder pressure, for the activated carbon sorbent.

FIG. 6 is a plot of percent $AsH_3$ remaining in the delivery system cylinder vs. cylinder pressure, in torr, for the activated carbon sorbent.

Figure 7:
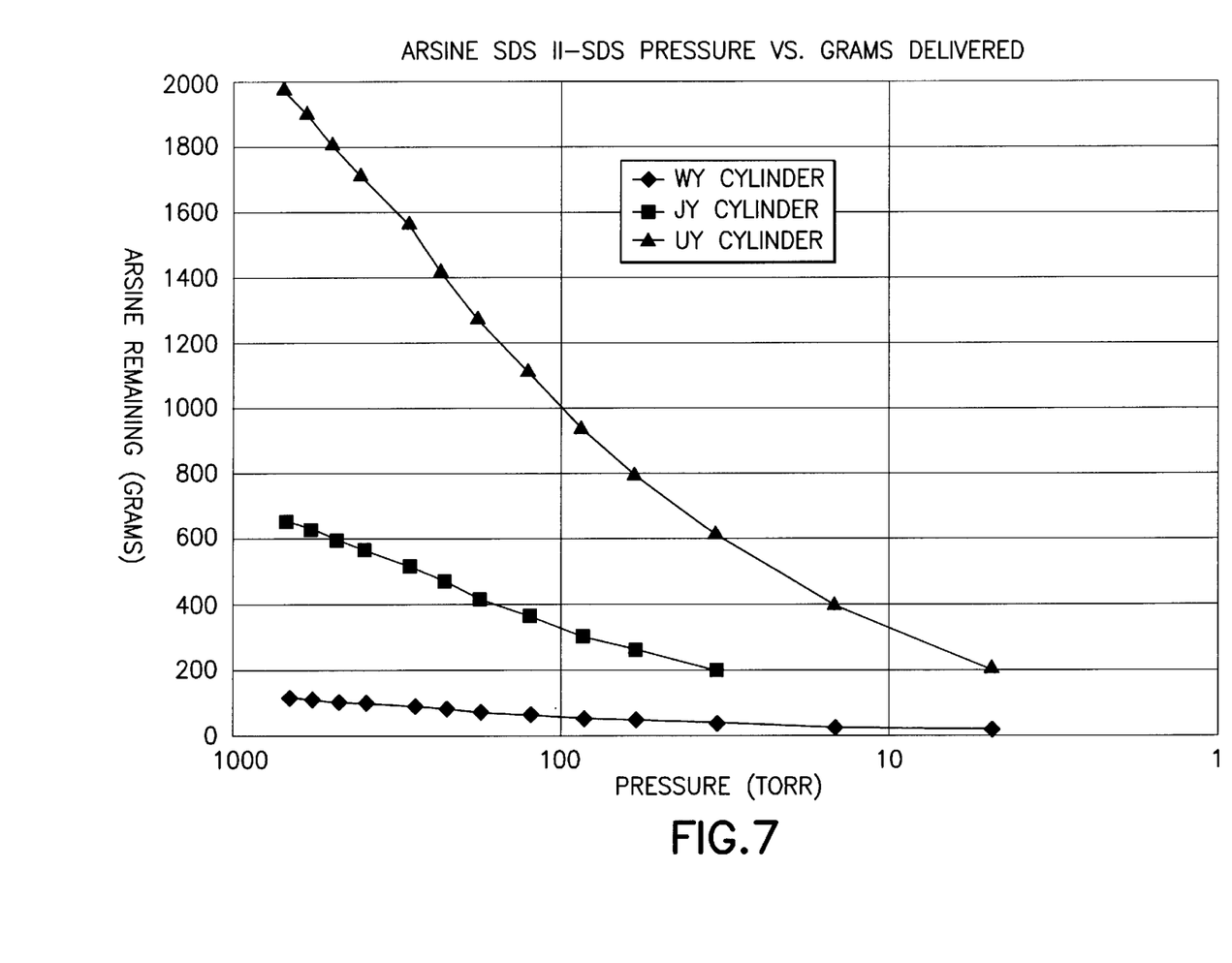
FIG. 7 is a plot of percent $AsH_3$ remaining in the delivery system cylinder vs. grams $AsH_3$ delivered, for the activated carbon sorbent.

FIG. 7 is a plot of $AsH_3$ remaining in the delivery system cylinder, in grams $AsH_3$, as a function of cylinder pressure, in torr, for the activated carbon sorbent.

Figure 8:
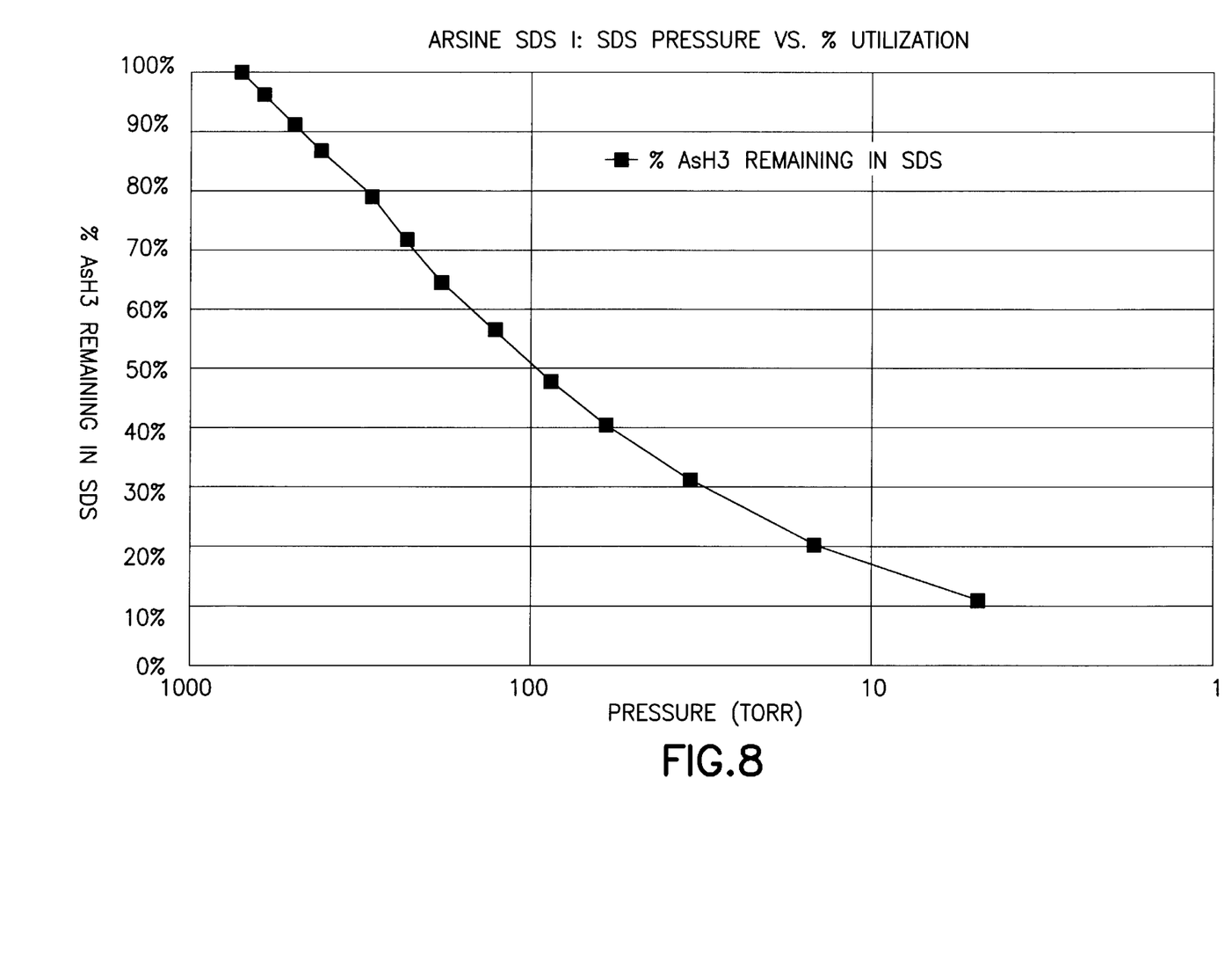
FIG. 8 is a plot of percent $AsH_3$ remaining in the delivery system cylinder vs. cylinder pressure, for binderless zeolite sorbent.

FIG. 8 is a plot of percent $AsH_3$ remaining in the delivery system cylinder vs. cylinder pressure, in torr, for binderless zeolite sorbent.

Figure 9:
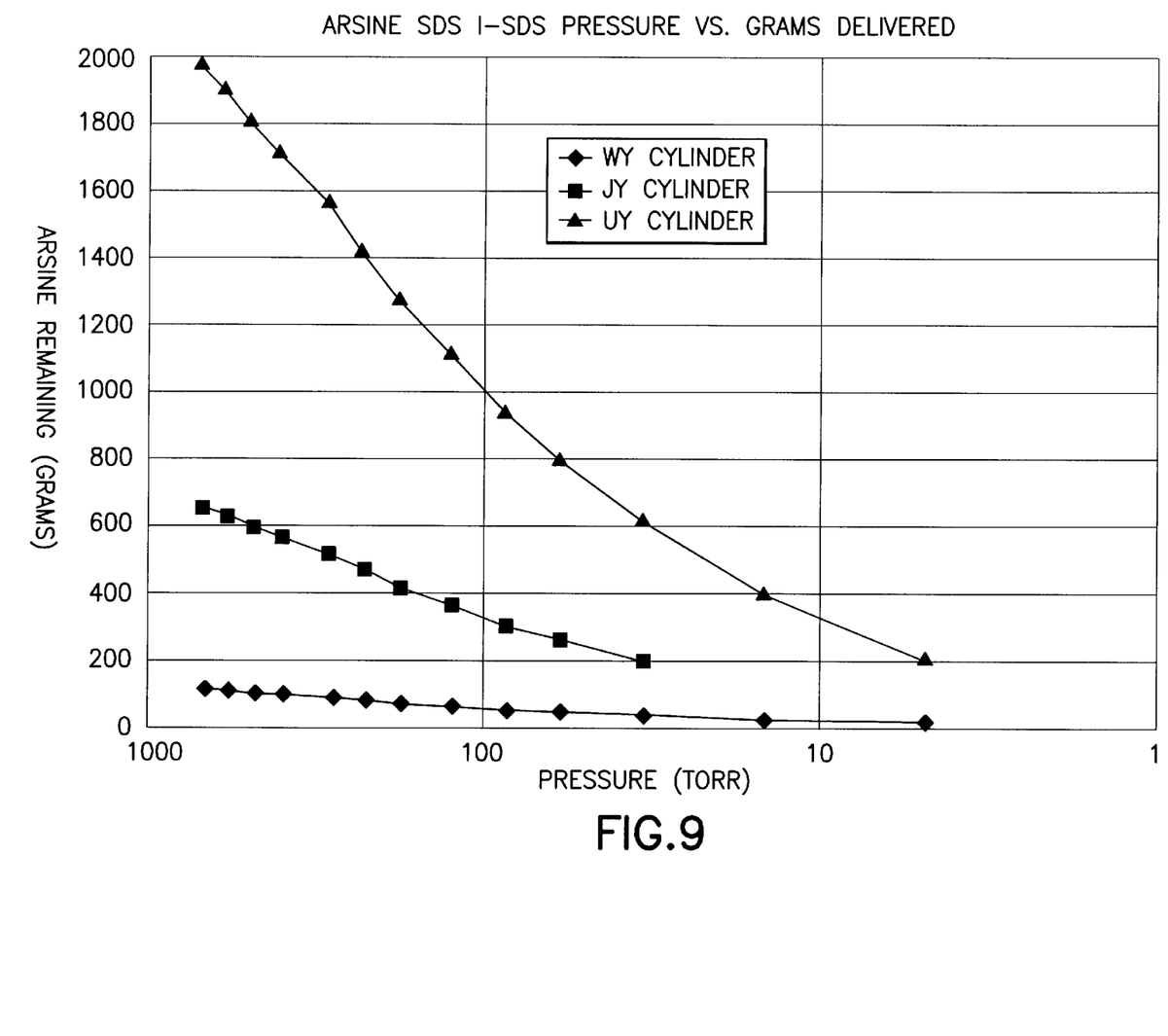
FIG. 9 is a plot of percent $AsH_3$ remaining in the delivery system cylinder vs. grams $AsH_3$ delivered, for binderless zeolite sorbent.

FIG. 9 is a plot of $AsH_3$ remaining in the delivery system cylinder, in grams $AsH_3$, as a function of cylinder pressure, in torr, for binderless zeolite sorbent.

A comparison of the data in the tabulation above shows the activated carbon sorbent of the present invention to have a substantially higher arsine loading capacity in relation to the binderless zeolite 5A material, and highly beneficial gas desorption/release characteristics.

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure.

What is claimed is:

1. A fluid storage and dispensing system, comprising:

a fluid storage and dispensing vessel;

a solid-phase physical adsorbent medium in the vessel, having sorptive affinity for the fluid; and means for desorbing fluid and discharging same from the vessel;

wherein the solid-phase physical adsorbent medium comprises a particulate activated carbon sorbent having at least 95% of its porosity constituted by pores in a pore diameter range of from about 5 Angstroms to about 40 Angstroms, and at least 75% of its porosity constituted by pores in a pore diameter range of from about 4 Angstroms to about 25 Angstroms, with a maximum pore volume measured by a Horvath-Kawazoe Differential Pore Volume Plot being between about 5 Angstroms and about 10 Angstroms pore diameter, and wherein the solid-phase physical adsorbent medium has a cumulative pore volume between about 0.35 and about 0.6.

2. A system according to claim 1, wherein the activated carbon sorbent comprises bead activated carbon sorbent of substantially uniform spherical particle shape.

3. A system according to claim 1, wherein said activated carbon sorbent has a working capacity for arsine measured at 5 torr and 650 torr, of from about 250 to about 275 grams of arsine per liter of said activated carbon sorbent, at 25 ° C.

4. A system according to claim 1, wherein said activated carbon sorbent is characterized by a percent desorbable sorbate, for arsine gas, in a range of from about 60 percent to about 90 percent.

5. A system according to claim 1, wherein said activated carbon sorbent has a particle size in a range of from about 0.1 millimeter to about 1 centimeter diameter.

6. A system according to claim 1, wherein said activated carbon sorbent has a particle size in a range of from about 0.25 millimeter to about 2 millimeters diameter.

7. A system according to claim 1, wherein said activated carbon sorbent exhibits a Cumulative Pore Volume Plot as shown in FIG. 4.

8. A system according to claim 1, wherein said activated carbon sorbent exhibits a plot of cumulative pore volume as shown by one of the curves of FIG. 5.

9. A system according to claim 1, wherein said activated carbon sorbent is washed with hydrofluoric acid for removal of metals and oxidic transition metal species therefrom, prior to adsorption of said fluid thereon.

10. A system according to claim 1, wherein said activated carbon sorbent comprises a carbon material selected from the group consisting of wood-based carbons, peat-based carbons and coal-based carbons.

11. A fluid storage and dispensing system, comprising:

a fluid storage and dispensing vessel;

a solid-phase physical adsorbent medium in the vessel, having sorptive affinity for the fluid; and means for desorbing fluid and discharging same from the vessel;

wherein said solid-phase physical adsorbent medium has been subjected to washing treatment to remove metals and oxidic transition metal species from said solid-phase physical adsorbent medium prior to adsorption of said fluid thereon.

12. A system according to claim 11, wherein said washing treatment comprises washing the physical adsorption medium with hydrofluoric acid.

13. A system according to claim 11, wherein the solid-phase physical sorbent medium comprises an activated carbon sorbent.

* * * * *